Patented Oct. 15, 1940

2,218,176

UNITED STATES PATENT OFFICE 2,218,176

STRUCTURE FOR PREVENTING STATIC ELECTRICITY

Joseph C. Patrick, Morrisville, Pa., assignor to Thiokol Corporation, Yardville, N. J., a corporation of Delaware No Drawing. Application February 11, 1937, Serial No. 125,271. Renewed March 12, 1940

7 Claims. (Cl. 242—157)

This invention relates to a process and also to products or apparatus, such as guides and the like, by which the generation of static electricity by friction with moving objects is avoided.

It is well known that when moving objects, such as threads of silk, cotton, wool, cellulose esters, as well as strips of paper, cloth, leather, etc. are caused to pass over rods or through guides or the like, especially where they come into contact with metal, rubber, glass or other hard surfaces, static electricity is generated and often accumulates to such an extent that sparks occur, with consequent fire hazards or danger of explosions.

These difficulties or objections are overcome by the present invention by making the guides or the like for such moving objects of a rubber-like organic material, or covering the contacting surfaces of other solid materials with this rubber-like organic material.

This rubber-like material is made up of organic disulfides, sometimes referred to as synthetic rubber. It has been found that, for this purpose, organic disulfides should be free or substantially free from loosely bound sulfur or that the sulfur should be in a firm state of chemical combination in the molecules. In this condition the organic disulfides do not discolor bright surfaces of silver or copper when brought into contact therewith.

The organic disulfides suitable for the present invention may be made by causing reaction to take place between water soluble or alkaline polysulfides, such as sodium potassium or calcium polysulfides, for example, and organic compounds of the formula $XCH_2-R-CH_2X'$, in which X and X' are monovalent negative elements or groups and R is a divalent element or group capable of existing in stable combination with two symmetrically arranged methylene groups.

The reaction products are chain compounds which have molecular weights at least as high as many hundred and are believed to be of the formula

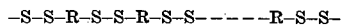

These long chain reaction products should be free, or substantially free, from sulfur linkages of the character

If such linkages occur in the reaction product they should be treated with a reducing agent, such as an alkali sulfide or hydroxide, such as sodium sulfide or sodium hydroxide, for example, to remove the loosely combined sulfur.

The organic disulfides to be used in this invention are elastic and chemically stable. They contain a large amount of combined sulfur and will withstand exposure to air and sunlight for many months without appreciable deterioration. They will not freeze or become brittle at 30° C. below zero. They are non-porous and non-hygroscopic and are practically insoluble in such solvents as gasolene, ethyle acetate, alcohol, acetone, ether, etc. They can be made hard and tough, while still remaining elastic, by curing them at an elevated temperature, so that their resistance to abrasion is very great. Before they are cured they can be caused to adhere firmly to metal or other hard surfaces, or they can be attached to such surfaces by cements or otherwise, either before or after they are cured, or a solid block or other shape thereof can be used as a guide or rubbing surface for threads and strips of cloth and leather.

Although many compounds of the formula mentioned above may be used as the starting material with which to make the rubber-like products that are to be used in this invention, it has been found that dichloroether and chloroethoxy ether are especially useful for this purpose, although many other halogenated organic compounds can be used for making the reaction products suitable for this invention.

Among many examples that can be used for making the organic disulfides may be mentioned the treatment of 143 grams of symmetrical dichloroethyl ether with a 2 molar concentration of sodium tetrasulfide in a liter of water. The mixture is thoroughly agitated and warmed to about 60° C. at the start and the reaction is increased to a finishing temperature of about 105–110° C. and is finished in about two to three hours.

If the product is prepared in the presence of a suitable dispersing agent it will be in the form of a latex-like suspension and in a suitable condition for reduction to the disulfide derivative by repeated treatments with an agent capable of removing any free or loosely combined sulfur, such as, for example, by repeated treatment with a hydroxide of an alkali or an alkaline earth metal, or with a monosulfide or hydrosulfide of such metals. This method should be continued until, after thorough washing, another such treatment produces no further evidence of polysulfide formation, thereby indicating the complete removal of all sulfur except that combined as the disulfide, after which the latex can be washed or purified in any suitable manner.

I claim:

1. A guide for moving objects which generate static electricity by friction with solids, which comprises a solid material having an organic polymeric disulfide along the surface thereof that is to be contacted by said moving objects.

2. A guide for moving objects which generate static electricity by friction with solids, which comprises a solid material having an organic polymeric disulfide having substantially all of the sulfur in it in a firm state of combination along the surface thereof that is to be contacted by said moving objects.

3. A guide for moving objects which generate static electricity by friction with solids, which comprises a solid material having an organic polymeric disulfide consisting substantially of chain molecules in which the organic radicals are connected by —S—S— groups along the surface thereof that is to be contacted by said moving objects.

4. A guide structure for material including paper, fabric and thread, said guide structure having a surface, which material in the operation of said structure undergoes relative motion in relation to the surface of said guide and in contact therewith, said surface comprising an organic plastic characterized by an organic radical alternating with a pair of sulfur atoms.

5. A guide structure for material including paper, fabric and thread, said guide structure having a surface, which material in the operation of said structure undergoes relative motion in relation to the surface of said guide and in contact therewith, said surface comprising an organic polysulfide plastic from which substantially all loosely combined sulfur has been removed by treatment with a reducing agent.

6. A structure having a surface which if made from rubber would in use generate static electricity, said surface comprising as the dominant component thereof an organic polymer substantially identical with that obtained by reaction of an alkaline polysulfide with an organic compound having the formula $X.CH_2—R—CH_2.X'$ where X and X' are monovalent negative substituents, $CH_2$ is a methylene group and R is a structure selected from the group consisting of atoms and radicals, said structure being capable of existing in stable combination with said methylene groups whereby a polymer is obtained containing sulfur in loose and firm chemical combination, and reaction of said polymer with an alkaline hydroxide to remove said loosely combined sulfur; whereby the surface of said structure does not generate static electricity in use.

7. A structure having a surface which if made from rubber would in use generate static electricity, said surface comprising as the dominant component thereof an organic polymer substantially identical with that obtained by reaction of an alkaline polysulfide with an organic compound having the formula $X.CH_2—R—CH_2.X'$ where X and X' are monovalent negative substituents, $CH_2$ is a methylene group and R is a structure selected from the group consisting of atoms and radicals, said structure being capable of existing in stable combination with said methylene groups whereby a polymer is obtained containing sulfur in loose and firm chemical combination, and reaction of said polymer with a substance capable of combining with loosely combined sulfur, to remove said loosely combined sulfur; whereby the surface of said structure does not generate static electricity in use.

JOSEPH C. PATRICK.